(12) United States Patent
Price et al.

(10) Patent No.: US 11,977,552 B2
(45) Date of Patent: *May 7, 2024

(54) SYSTEM AND METHOD FOR REDUCING CLIENT-SERVER NETWORK TRAFFIC FOR INTERNET DATABASE QUERIES

(71) Applicant: Capital One Services, LLC, McLean, VA (US)

(72) Inventors: Micah Price, The Colony, TX (US); Chi-San Ho, Allen, TX (US); Rebecca Hummel, Richardson, TX (US); Avid Ghamsari, Carrollton, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,741

(22) Filed: Jul. 25, 2022

(65) Prior Publication Data

US 2022/0414109 A1 Dec. 29, 2022

Related U.S. Application Data

(63) Continuation of application No. 17/360,229, filed on Jun. 28, 2021, now Pat. No. 11,436,239.

(51) Int. Cl.
| | | |
|---|---|---|
| *G06F 16/2457* | (2019.01) | |
| *G06F 16/22* | (2019.01) | |
| *G06F 16/242* | (2019.01) | |
| *G06F 16/28* | (2019.01) | |

(52) U.S. Cl.
CPC .... *G06F 16/24578* (2019.01); *G06F 16/2246* (2019.01); *G06F 16/244* (2019.01); *G06F 16/24575* (2019.01); *G06F 16/282* (2019.01)

(58) Field of Classification Search
CPC .......... G06F 16/24578; G06F 16/2246; G06F 16/282; G06F 16/244; G06F 16/24575
See application file for complete search history.

(56) References Cited

U.S. PATENT DOCUMENTS

| | | | |
|---|---|---|---|
| 6,341,280 B1 * | 1/2002 | Glass | G06F 16/10 707/754 |
| 7,870,117 B1 * | 1/2011 | Rennison | G06N 20/00 707/723 |
| 2002/0062311 A1 * | 5/2002 | Kircher | G06F 16/8373 |
| 2006/0293065 A1 * | 12/2006 | Chew | H04W 4/02 455/456.3 |
| 2022/0405334 A1 * | 12/2022 | Rozich | G06F 16/954 |

* cited by examiner

*Primary Examiner* — Kuen S Lu
(74) *Attorney, Agent, or Firm* — Perkins Coie LLP

(57) ABSTRACT

Methods and systems are described herein for improvements for reducing client-server network traffic. For example, methods and systems allow for the reduction of client-server network traffic by altering search filters based on their respective rank and/or frequencies of being searched with other search filters included in a search query. In this way, users do not have to resubmit queries that are illogical or would return a null set of search results. For example, a first query may be received. A first search may be performed based on the first query. A first search filter may be selected based on a hierarchical tree structure of search filters. A second query may be generated comprising the first search filter and one or more other search filters, wherein the second query comprises fewer search filters than the first query, and a second search may be performed based on the second query.

20 Claims, 11 Drawing Sheets

300

SYSTEM AND METHOD FOR REDUCING CLIENT-SERVER NETWORK TRAFFIC FOR INTERNET DATABASE QUERIES

CROSS-REFERENCE TO RELATED APPLICATION(S)

This application is a continuation of U.S. patent application Ser. No. 17/360,229, filed Jun. 28, 2021. The content of the foregoing application is incorporated herein in its entirety by reference.

BACKGROUND

When browsing an inventory of items on the Internet (e.g., searching vehicles using search filters), users may use search filters that are too specific—thus returning null search results (e.g., no search results). Users may continue to search by adding additional search filters or revising the previously used search filters, which increases the amount of traffic between the client and server.

SUMMARY

Methods and systems are described herein for an improved mechanism for reducing client-server network traffic. In particular, client-server network traffic may be reduced by generating an optimized filter. By doing so, users may be provided with search results even if the original search query would have normally returned null search results—thus, guaranteeing search results for the users. In some embodiments, an optimized filter may be generated by altering an original search query such that users are presented with non-null search results. By altering the original search filter and not having the users re-submit a new search query, client-server network traffic can be reduced. For example, users may find a suitable vehicle to purchase based on the original search query without having the users submit additional queries to a database regardless of whether the original search query included search filters that are too specific.

In some embodiments, a first query comprising a plurality of search filters may be received. A first search may be caused to be performed based on the first query. In response to the first search returning a null set, a first search filter may be selected from the plurality of search filters based on a hierarchical tree structure of search filters, wherein the hierarchical tree structure of search filters indicates that the first search filter has a higher rank than each other search filter of the plurality of search filters. A second query comprising the first search filter and one or more other search filters of the plurality of search filters may be generated, wherein the one or more other search filters are selected based on a frequency with which previously submitted queries comprise the first search filter and each other search filter of the plurality of search filters, wherein the second query comprises fewer search filters than the first query. A second search may be caused to be performed based on the second query.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
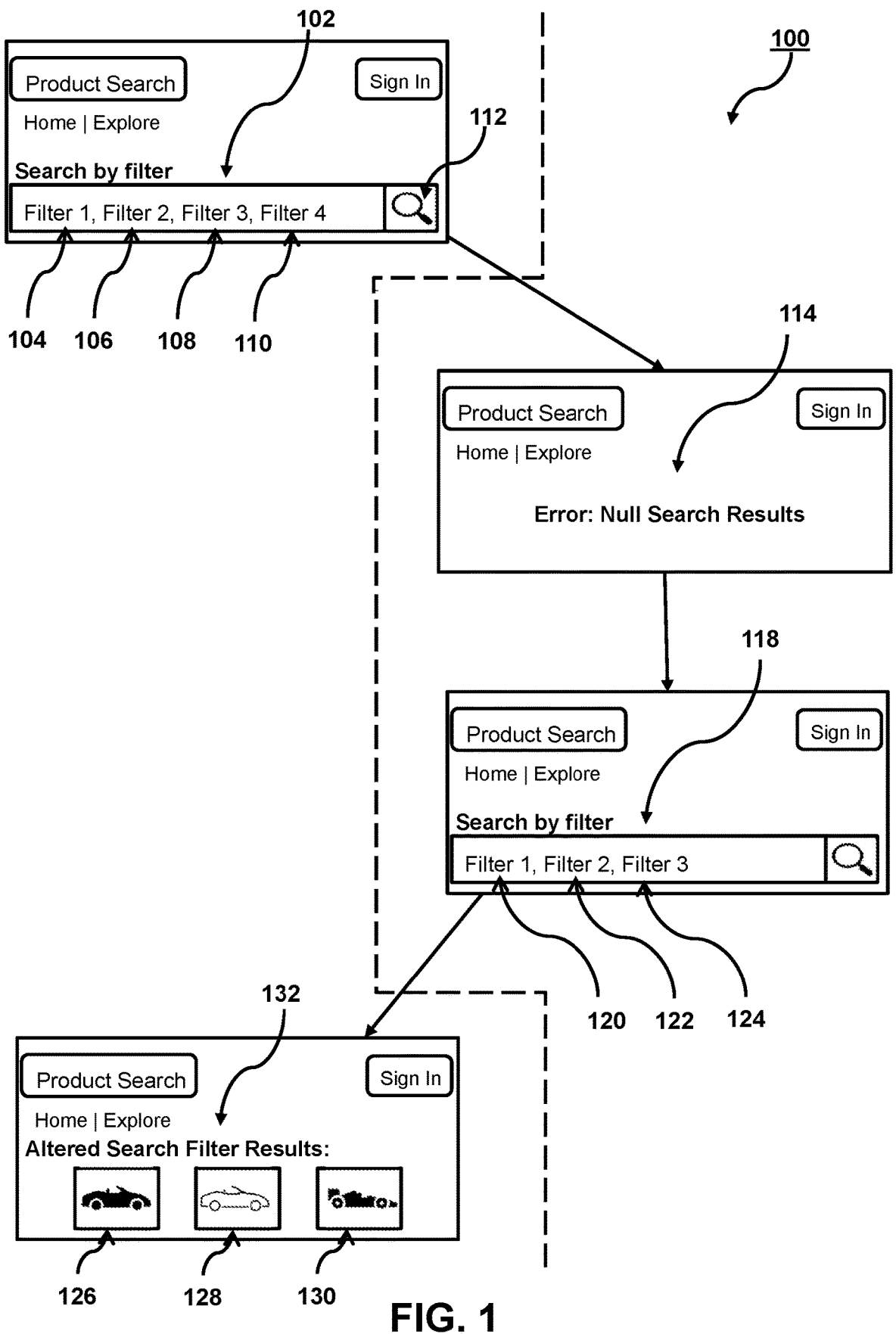
FIG. 1 shows illustrative user interfaces describing a process for reducing client-server network traffic, in accordance with one or more embodiments.

FIG. 1 shows illustrative user interfaces describing a process 100 for reducing client-server network traffic, in accordance with one or more embodiments. For example, FIG. 1 shows what a user may visually see when entering a search query (e.g., to the left of the dashed line) and what may be performed "behind the scenes" (e.g., to right of the dashed line). In some embodiments, a user may provide a first query 102 including a plurality of search filters 104-110 (e.g., a first search filter 104, a second search filter 106, a third search filter 108, and a fourth search filter 110) into a search input portion of a webpage. For instance, the webpage may include a search bar that allows a user to input a string of characters, images, audio, or other data. After inputting the search query, the user may invoke a search button 112 to cause a search process to be performed, by searching through a database, for identifying and providing search results that are relevant to the given search query. In some embodiments, first search filter 104, second search filter 106, third search filter 108, and fourth search filter 110 may correspond to keywords describing features of an item or information that the user desires to obtain search results for. For example, search filters 104-110 may describe features of a vehicle (e.g., vehicle make, vehicle model, vehicle color, vehicle body style, etc.), features of a domicile (e.g., number of bedrooms, number of bathrooms, home type, etc.), features of a content item (e.g., content creator, content name, etc.), or other features. In some embodiments, the search bar may display one or more suggested search filters.

In some embodiments, first query 102 causes null search results 114 to be returned. For example, first query 102 including search filters 104-110 may return no search results, or less than a threshold number of search results. No search results may be returned for a variety of reasons, including, but not limited to, too many search filters being used, search filters that are too specific, search filters that contradict one another, illogical search filters, no search results, or other reasons. In some embodiments, in response to determining that null search results 114 are obtained based on first query 102, a second query 118 which may include a fifth search filter 120, a sixth search filter 122, and a seventh search filter 124 may be generated. In some embodiments, fifth search filter 120, sixth search filter 122, and seventh search filter 124 may be the same or similar to first search filter 104, second search filter 106, and third search filter 108, respectively, however alternatively, filters 120-124 may differ.

In response to second query 118 being generated, the database may be accessed again to determine if any search results are identified that relate to search filters 120-124. If search results are found, then the user may be presented with a message 132 indicating the identified search results (e.g., first search result 126, second search result 128, third search result 130, etc.). In some embodiments, message 132 may also indicate that the first query has been altered, and may provide the user with second query 118. In this way, the user is presented with search results even if no search results, or less than a threshold number of search results (e.g., less than 10 search results, less than 5 search results, etc.) were identified for the (original) first query 102. By automatically transforming a submitted query into another query to facilitate providing the user with a search result set, user frustration by not obtaining search results for their original query (e.g., first query 102) and having to manually reformat the original query can be alleviated. Furthermore, in this way, the techniques described herein produce the technical benefit of reducing client-server network traffic by reducing a number/quantity/frequency of data transmitted between a user device and a server. For example, each time a user revises the search query, additional data packets (e.g., HTTP requests) including revised queries may be sent across the network from the user's client device to the server (or database), increasing the amount of data consumed by the network to facilitate this client-server traffic. The techniques described herein solve the aforementioned technical problem by reducing or otherwise eliminating the need for additional data to be transmitted across the network to the server, and as well, as being provided to the client (e.g., to indicate that the previously submitted query did not produce a search result set satisfying a threshold condition).

As described herein a vehicle refers to any transportation means. Some example transportation means may include, but are not limited to, automobiles (e.g., cars, trucks, buses, etc.), aircrafts (e.g., planes, helicopters, etc.), watercrafts (e.g., boats, kayaks, canoes, jet skis, etc.), motorcycles, bicycles, unicycles, tricycles, skateboards, roller skates, roller blades, scooters, and the like. Furthermore, the various vehicles may be "new" vehicles, "pre-owned" vehicles, rental vehicles, or other vehicles. While the foregoing embodiments relate to search filters for describing vehicles to be searched for via a submitted query, other data items may also be searched for using the techniques described herein. For example, search filters included in a search query may refer to a musical instrument, an electronic device (e.g., a cell phone, television, gaming console, etc.), a household appliance (e.g., a dishwasher, refrigerator, barbeque, etc.), wearable items (e.g., clothing, jewelry, footwear, etc.), domiciles (e.g., houses, apartments, tents, etc.), texts (e.g., books, graphic novels, etc.), and the like. Still further, data items such as textual content, audio content, video content, or a combination thereof, may also be searched for by using the techniques described herein.

Figure 2:
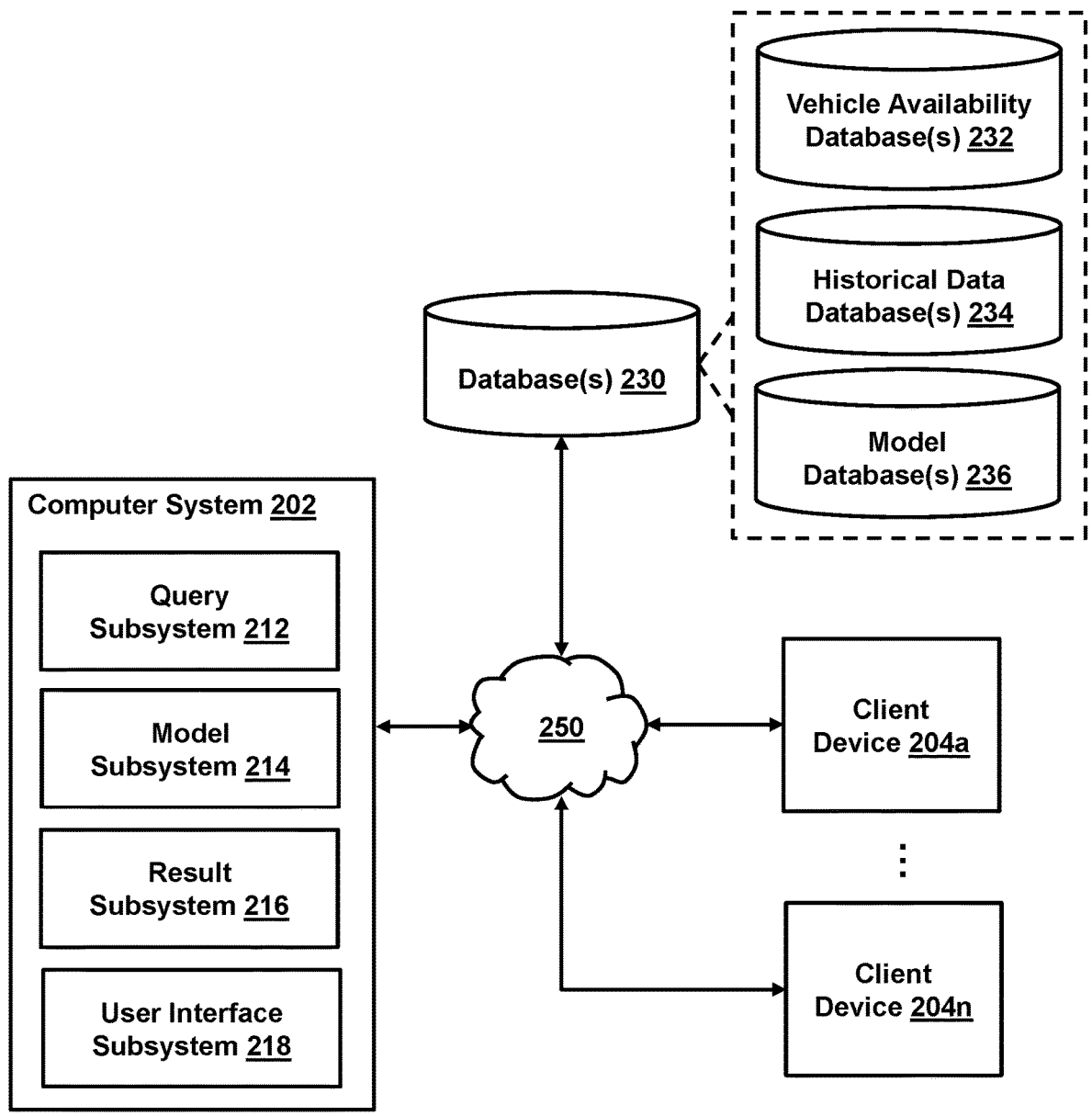
FIG. 2 shows a system for reducing client-server network traffic, in accordance with one or more embodiments.

FIG. 2 shows a system for reducing client-server network traffic, in accordance with one or more embodiments. As shown in FIG. 2, system 200 may include a computer system 202, client devices 204a-204n (collectively referred to as "client devices 204," and individually referred to as "client device 204"), or other components. Computer system 202 may include query subsystem 212, model subsystem 214, results subsystem 216, user interface subsystem 218, and/or other components. System 200 may also include database(s) 230, which may include vehicle availability database(s) 232, historical data database(s) 234, and model database(s) 236. Each of vehicle availability database(s) 232, historical data database(s) 234, and model database(s) 236 may include one or more databases, which may be located at a single facility or may be distributed amongst a number of server sites. As described herein, each of vehicle availability database(s) 232, historical data database(s) 234, and model database(s) 236 may be referred to as vehicle availability database 232, historical data database 234, and model database 236. Each client device 204 may include any type of mobile terminal, fixed terminal, or other device. By way of example, client device 204 may include a desktop computer, a notebook computer, a tablet computer, a smartphone, a wearable device, or other client device. Users may, for instance, utilize one or more of client devices 204a-204n to interact with one another, one or more servers, or other components of system 200. It should be noted that, while one or more operations are described herein as being performed by particular components of computer system 202, those operations may, in some embodiments, be performed by other components of computer system 202 or other components of system 200. As an example, while one or more operations are described herein as being performed by components of computer system 202, those operations may, in some embodiments, be performed by components of client device 204. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 200 may facilitate reducing client-server network traffic. In some embodiments, system 200 may receive a first query (e.g., a string of characters, a string of keywords, a string of key-terms, one or more search filters, etc.) including a plurality of search filters (e.g., keywords, key-terms, key-phrases, etc.). The first query may be submitted by a user via client device 204. For example, a user may access a webpage associated with computer system 202 and input the string of characters via a search function on the webpage (e.g., via a search bar). A voice input, image input, or other input type may be used in addition to or instead of a string of characters. In some embodiments, computer system 202 may cause a first search to be performed based on the first query (e.g., by searching a database, multiple databases, etc.). If the first search fails to satisfy a first condition, computer system 202 may generate a second query and perform a second search based on the second query. In some embodiments, the first condition may be satisfied if the number of search results identified based on the first query is greater than or equal to a threshold number of search results. For example, the threshold number of search results may be 1 or more search results, 10 or more search results, 50 or more search results, 100 or more search results, etc. In some embodiments, the first condition may be satisfied if the number of search results identified based on the first query is less than a threshold number of search results. For example, the threshold number of search results may be 10 or fewer search results, 5 or fewer search results, or 1 or fewer search results, or no search results. In some cases, no search results being identified is referred to as a NULL set of search results.

The second query may include one or more search filters selected from the plurality of search filters included in the first query. For example, the second query may include a first search filter from the plurality of search filters and one or more other search filters of the plurality of search filters. Alternatively, one or more different search filters may be included in the second query. In some embodiments, the one or more search filters may be selected based on a hierarchical tree structure of search filters. As described herein, a hierarchical tree structure may include various types of data structures including, but not limited to, (which is not to imply that other lists are limiting), a tree structure, a linked-list, degenerate tree structure, digital tree structure, or other data structure types. In some embodiments, the hierarchical tree structure of search filters may indicate that the first search filter has a higher rank (e.g., numeric rank, quantitative rank, qualitative rank, importance, level, hierarchy, etc.) than each other search filter of the plurality of search filters. In some embodiments, the search filters included in the second query may be selected based on a frequency with which previously submitted queries include a particular search filter from the plurality of search filters and each other search filter of the plurality of search filters. For example, if the first query included a first search filter, a second search filter, and a third search filter, the second query may include the first search filter and the second search filter based on data indicating that the first search filter and the second search filter are included together in queries more frequently than the first search filter and the third search filter are included together in queries. In some embodiments, the second query may include fewer search filters than the first query. In some embodiments, computer system 202 may cause a second search to be performed based on the second query.

In some embodiments, the first query and the second query may be a vehicle availability query including a set of vehicle feature filters. A vehicle availability query refers to a query for identifying an availability of vehicles satisfying parameters specified by the users. The parameters specified by the user may include the vehicle feature filters included in the set of vehicle feature filters. Some examples of vehicle feature filters include, but are not limited to, (which is not to imply that other lists are limiting), a vehicle make, model, exterior color, interior color, or other features. The first query and the second query may alternatively be home availability queries, product availability queries, item availability queries, content availability queries, or other queries. These queries may each include their own types of filters which can be used to parameterize the search criteria.

As described herein, the term "feature filter" and the term "search filter" may be used interchangeably. Similarly, the term "vehicle feature filter" and the term "vehicle search filter" may be used interchangeably.

In some embodiments, computer system 202 may access vehicle availability database 232, which may store data indicating vehicles available for purchase. For example, computer system 202, in response to receiving the first vehicle availability query from client device 204, may submit a request for search results via a first application programming interface (API) request including the first vehicle availability query. The set of vehicle feature filters may be used as the keywords to search vehicle availability database 232. Vehicle availability database 232 may be queried to identify any vehicles that are relevant to the set of vehicle feature filters. In some embodiments, vehicle availability database 232 may store feature vectors including attributes characterizing aspects of various vehicles. When the API request is received, a feature vector including attributes characterizing the set of vehicle feature filters may be generated, and a similarity may be computed between the feature vector for the query and some or all of the feature vectors for the vehicles. For example, a similarity score may be computed based on an L2 distance between the query feature vector and the vehicle feature vector. If any of the similarity scores satisfy a threshold similarity score (e.g., similarity score greater than or equal to 0.75, similarity score greater than or equal to 0.80, similarity score greater than or equal to 0.90), then the vehicles associated with those vehicle feature vectors may be included as search results for the submitted query.

In some embodiments, in response to the first query returning a null set, computer system 202 may select a first vehicle feature filter from the set of vehicle feature filters based on a hierarchical tree of vehicle feature filters. The hierarchical tree of vehicle feature filters may indicate a ranking of various vehicle feature filters. The ranking may be a numeric rank, a quantitative rank, a qualitative rank, an importance, a level, a hierarchy, or other metric for distinguishing vehicle feature filters from other vehicle feature filters. As an example, a first vehicle feature filter may be selected based on the first vehicle feature filter having a rank that is greater than the other vehicle feature filters included in the first vehicle availability query. It should be noted that although the phrase "first vehicle feature filter may be selected" is used, the phrase is meant to indicate that any vehicle feature filter of the set of vehicle feature filters may be selected irrespective of order inputted into the first query, but rather based on their respective rank.

In some embodiments, historical query data may be retrieved from historical data database 234. The historical query data may indicate frequencies with which pairs of filters are included in a same query. For instance, pairs of filters (e.g., pairs of vehicle feature filters) may collectively be referred to as co-filters. For example, a vehicle feature filter may be referred to as a co-filter when included in a same query as another vehicle feature filter. For instance, if a first vehicle feature filter and a second vehicle feature filter are included in a same query, each of the first and second vehicle feature filters may be referred to as a co-filter because they are concurrently being searched together or have been previously searched together. As an example, the historical query data may indicate how many times one or more vehicle feature filters were searched together with one or more other vehicle feature filters. For example, the historical query data may indicate that "Vehicle Feature 1" and "Vehicle Feature 2" were included together in N1 previously submitted queries, and "Vehicle Feature 1" and "Vehicle Feature 3" were included in N2 previously submitted queries. If, in the aforementioned example, N1 is greater than N2, then this indicates that "Vehicle Feature 2" was searched with "Vehicle Feature 1" more frequently than "Vehicle Feature 3" was searched with "Vehicle Feature 1." Therefore, in this example, "Vehicle Feature 2" may be selected to be used with "Vehicle Feature 1" in a new query. In other words, "Vehicle Feature 3" may be removed from the original query when generating an updated query because "Vehicle Feature 3" is determined to be less relevant to "Vehicle Feature 1."

In some embodiments, computer system 202 may access vehicle availability database 232. For example, computer system 202, in response to generating the second vehicle availability query, may submit a request for search results via a second API request including the second vehicle availability query. If the second vehicle availability query satisfies the first condition (or a different condition), search results obtained based on the second vehicle availability query may be retrieved, and a user interface including the search results may be generated and provided to client device. In some embodiments, the user interface may include results returned from the access via the second API request. However, if the second search also fails to satisfy the first condition (e.g., the number of search results obtained based on the second vehicle availability query is less than the threshold number of search results), the process may repeat, and a new search query may be generated. This process may iteratively repeat until the first condition or another specified condition is satisfied. Of note, the user that initially submitted the first vehicle availability query may not be notified of the updated search queries that are generated until the search results are obtained (assuming that search results can be obtained). In this way, additional data is not transmitted to the user to indicate that their initial query yielded a search result set of little value to the user, and extra query submissions are not retrieved from the user. Thus, in reference to the foregoing, system 200 may achieve the technical benefit of reducing client-server network traffic by minimizing the amount of times a user submits a query to a database while still providing the user with an optimal set of search results.

Subsystems 212-218

Query subsystem 212 may be configured to receive a first query including a plurality of search filters from client device 204. For example, the first query may include a plurality of search filters. In some embodiments, the first query may be a first vehicle availability query including a set of vehicle feature filters. The first query may be in a natural language format, a query language format, or other format. In some cases, where the first query is in a natural language format, the first query may be transformed into a query language format.

Model subsystem 214 may be configured to accept a natural language query and transform the query into a Query Language (QL) format. In some embodiments, the QL format may be a format associated with various query languages such as, but not limited to, (which is not to imply that other lists are limiting), Structured Query Language (SQL), NoSQL, Contextual Query Language (CQL), Java Persistence Query Language (JPQL), or other query languages. In some embodiments, model subsystem 214 may communicate over network 250 to obtain one or more models from model database 236. Model database 236 may include one or more models transforming queries from one format to another. For example, model database 236 may include a model configured to generate a query having a QL format based on an input query having a natural language format.

Figure 3:
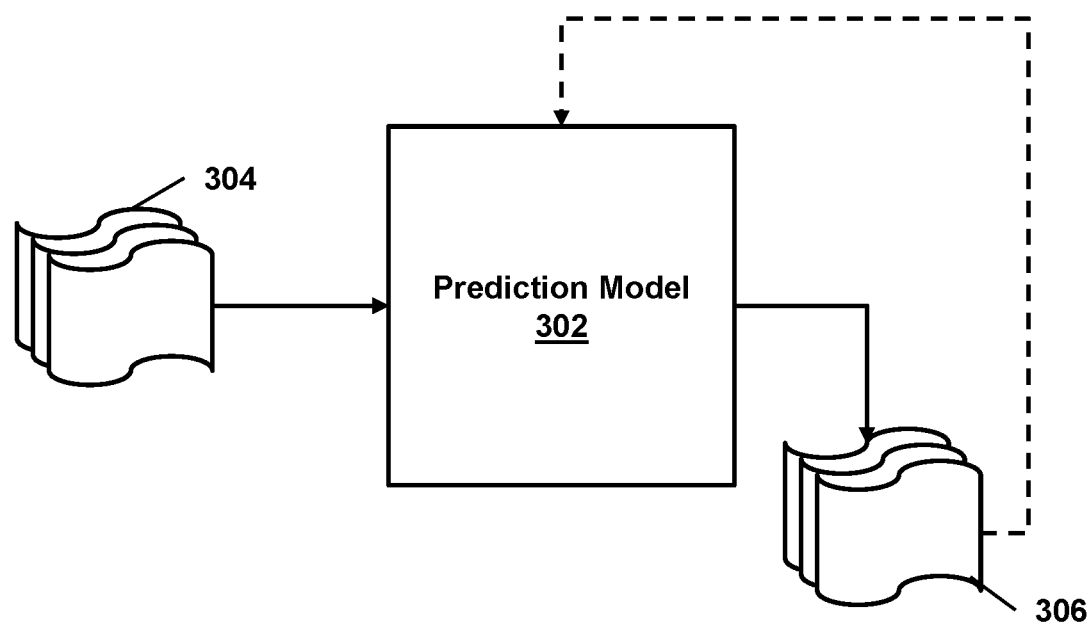
FIG. 3 shows a prediction model trained to input a natural language query and generate the query in a Query Language (QL) format, in accordance with one or more embodiments.

With respect to FIG. 3, prediction model system 300 shows an example of a prediction model trained to take, as input, a query in a first format and transform the query into a query having a second format. For example, prediction model system 300 may be trained to generate a query having a QL format based on a query having a natural language format. Prediction model system 300 may include a prediction model 302, inputs 304, and outputs 306. In some embodiments, prediction model 302 may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

As an example, prediction model 302 may take inputs 304 and provide outputs 306. In some embodiments, outputs 306 may be fed back to prediction model 302 as input to train prediction model 302 (e.g., alone or in conjunction with user indications of the accuracy of outputs 306, labels associated with the inputs, or with other reference feedback information). In some embodiments, prediction model 302 may update its configurations (e.g., weights, biases, or other parameters) based on its assessment of its prediction (e.g., outputs 306) and reference feedback information (e.g., user indication of accuracy, reference labels, or other information). In some embodiments, where prediction model 302 is a neural network, connection weights may be adjusted to reconcile differences between the neural network's prediction and the reference feedback. Some embodiments include one or more neurons (or nodes) of the neural network requiring that their respective errors be sent backward through the neural network to them to facilitate the update process (e.g., backpropagation of error). Updates to the connection weights may, for example, be reflective of the magnitude of error propagated backward after a forward pass has been completed. In this way, for example, the prediction model 302 may be trained to generate better predictions. In some embodiments, a set of labeled training data may be provided to prediction model 302. The labeled training data may include a set of natural language queries, the corresponding queries in a QL format, and the corresponding associated tags and/or labels. In some embodiments, a natural language query may only be provided as input to the prediction model such that the prediction model may output a prediction of what the transformed query should be. Since the training data also includes the ground truth transformed query in QL format, prediction model 302 may compare the output 306 (predicted transformed query) to the ground truth query in QL format to update the connection weights of prediction model 302 (in the case prediction model 302 is a neural network) in order to generate better predictions. This process may be repeated with the whole set of training data to improve the prediction model's accuracy.

In some embodiments, subsequent to prediction model system 300 being trained, prediction model 302 may be configured to receive a search query in a natural language format as input 304 and generates a search query in a QL format as output 306. For example, first query 102 of FIG. 1 may be in natural language format, which may not be suitable for searching a database because it is missing various labels, tags, markers, or other identifying features. Thus, in order to efficiently search a database, it may be helpful to associate certain labels, tags, markers, or other identifying features to the search filters the user has provided as input. Therefore, model subsystem 214 may use one or more prediction models (e.g., prediction model 302 or other machine learning models) to help facilitate transformation of a search query in natural language form to a QL format.

Figure 4:
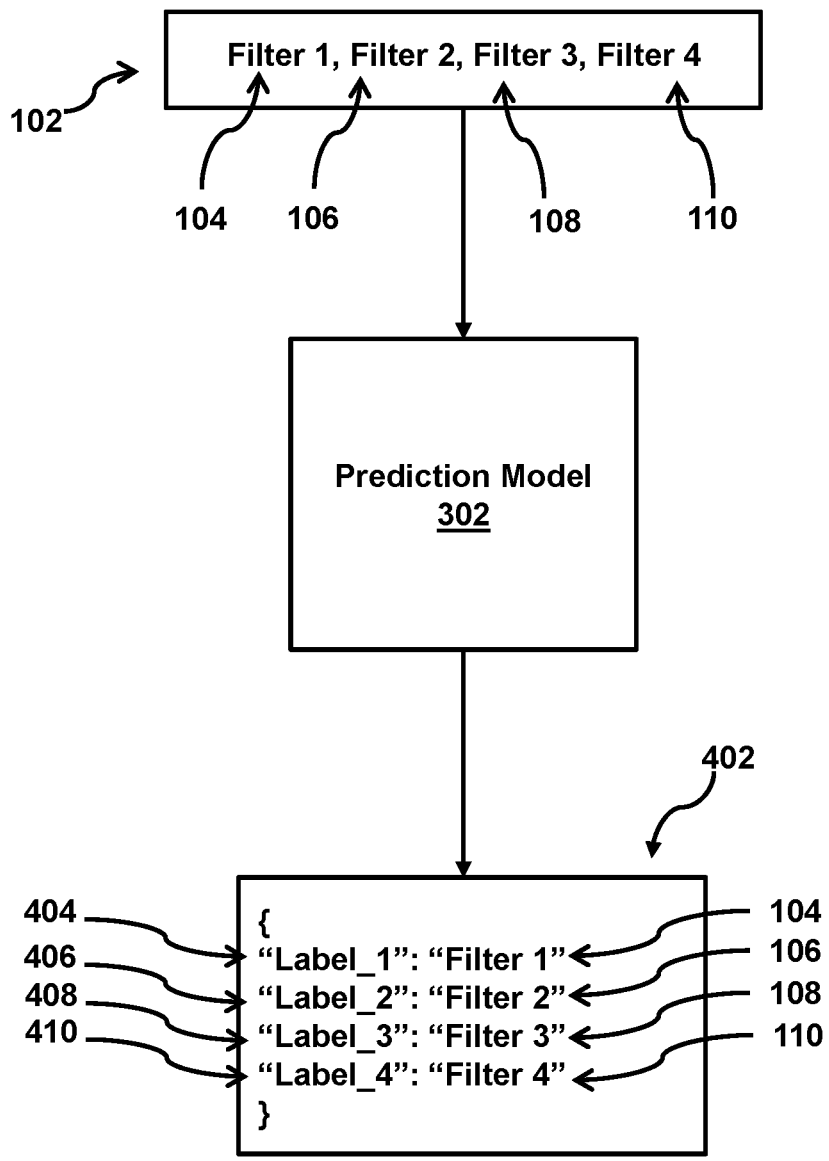
FIG. 4 shows a system for receiving a query and generating the query in a QL format, in accordance with one or more embodiments.

In some embodiments, model subsystem 214 may facilitate transforming a query in a first format to a second format. For example, with reference to FIG. 4, a system 400 may be configured for receiving a query in a first format and generating another query in a second format. In some embodiments, first query 102 may be provided as input to prediction model 302, which may output transformed query 402. In some embodiments, first query 102 may be in a natural language format and transformed query 402 may be in a QL format. As an example, first query 102 may represent a query submitted by a user to find vehicles matching one or more criteria. The criteria may be specified by search filters 104-110. For instance, search filter 104 may refer to a vehicle brand or manufacturer, search filter 106 may refer to a vehicle model, search filter 108 may refer to a vehicle style, and search filter 110 may refer to a vehicle color (e.g., an exterior color and/or an interior color). When first query 102 is input, each of search filters 104-110 may be in a natural language format. In other words, the search filters may lack labels indicating a feature type of each filter. In order for the system to efficiently utilize a database for searching for such a vehicle, it may be required that first query 102 to be transformed into a QL format. As mentioned above, prediction model 302 may be configured to identify and apply labels to each search filter included in the input search query. For example, in response to receiving first query 102 as input, prediction model may output transformed query 402, including labels 404-410. Each of labels 404-410 may be associated with one of search filters 104-110, respectively. As an example, first label 404 may correspond to the "Make" of the vehicle, second label 406 may correspond to the "Model" of the vehicle, third label 408 may correspond to the "Style" of the vehicle, and fourth label 410 may correspond to the "Exterior Color" of the vehicle. Although this example only shows four search filters and four labels, it is to be understood that there may be fewer or more search filters and corresponding labels. For instance, the transformed query may include one or more filters and one or more labels, ten or more filters and ten or more labels, or more. In some embodiments, a single search filter may be assigned two or more labels.

Some query languages may be able to transform a search query semantically and automatically from a natural language format to a query in a query language format. One example of such a query language is NoSQL. In these query languages, a prediction model may not be needed as the query may be automatically transformed into the transformed query.

Although the above example is in the context of searching for a particular vehicle, it should be noted that it may be used for searching for any products/services. For instance, in some embodiments, a user may be searching for computers, cosmetics, groceries, services, instruments, etc. In such instances, search filters may correspond to a particular product and labels may correspond to a company's name. In other embodiments, the search filters and labels may correspond to other types of information.

Returning to FIG. 2, in response to obtaining the query in a database accessible format, such as, for example, a QL format (e.g., transformed query 402), query subsystem 212 may be configured to perform a first search based on transformed query 402. In some embodiments, query subsystem 212 may access vehicle availability database 232 based on transformed query 402. Vehicle availability database 232 may include one or more data structures that stores data related to vehicles a retailer or other merchants may have available for purchase. As an example, vehicle availability database 232 may be accessed via an API request that includes transformed query 402. Subsequent to accessing vehicle availability database 232, results subsystem 216 may obtain search results retrieved based on transformed query 402 and may determine whether the obtained search results satisfy a threshold condition. In some embodiments, the threshold condition may be satisfied if the number of search results obtained in response to a query is greater than a threshold number of search results (e.g., 1 or more search results, 10 or more search results, 50 or more search results, 100 or more search results, etc.).

In some embodiments, results subsystem 216 may determine that the first search returns search results that do not satisfy the threshold condition. In response to determining that the threshold condition is not satisfied, results subsystem 216 may be configured to notify query subsystem 212 to update or otherwise revise original query (e.g., first query 102) or transformed query 402 used to obtain the search results of the first search. In some embodiments, to update a query, query subsystem 212 may select one of the filters used in the original (or transformed) query and, based on the selected filter, identify other search filters frequently searched with the selected filter. The search filter may be selected based on a hierarchical tree structure of search filters.

Figure 5:
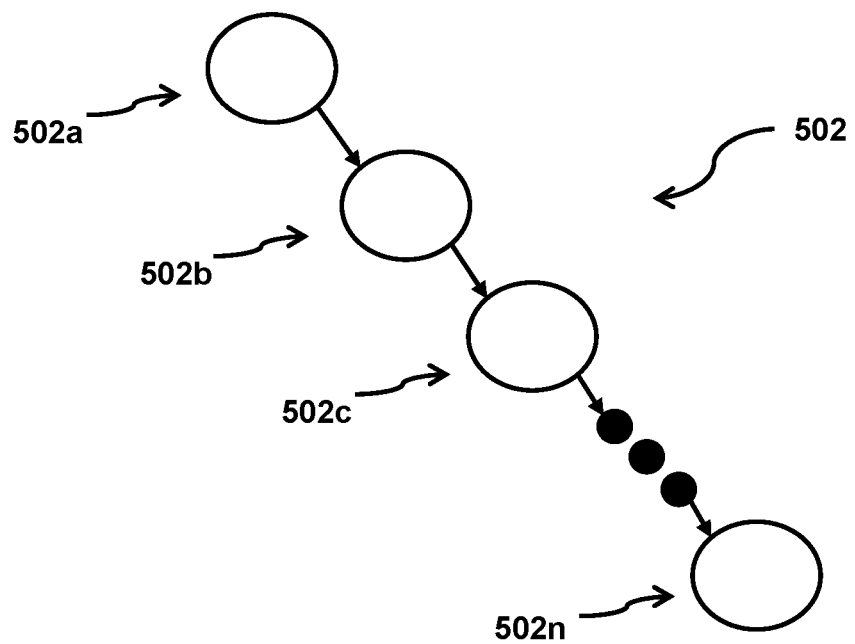
FIG. 5 shows a hierarchical tree structure for ranking search filters, in accordance with one or more embodiments.

Referring to FIG. 5, a hierarchical tree structure 502 for ranking search filters is shown, in accordance with one or more embodiments. Hierarchical tree structure 502 may be a tree structure that is used for determining the rank of one or more search filters. For example, hierarchical tree structure 502 includes a plurality of nodes 502a-502n. In some embodiments, each of nodes 502a-502n represents a search filter ranked in relation to other search filters. For example, in hierarchical tree structure 502, node 502a may represent a "highest" ranked search filter, node 502b may represent a next "highest" ranked search filter, and so on. The ranking may be based on a level of importance determined for each search filter when included in a search query. For example, for search filters related to vehicles, the filter "Make" may be more relevant to the intent of the search query than the filter "interior color." Therefore, in this example, the filter "Make" may be represented by a higher ranked node, such as node 502a, 502b, whereas the filter "interior color" may be represented by a lower ranked node, such as node 502c, 502n, etc. It is to be noted, that although hierarchical tree structure 502 shows up to "n" nodes, there may be as few as two nodes, or up to as many as 10, 100, 1000, 10000, or more nodes. Each node of hierarchical tree structure may be associated with a key-value pair, where the key represents a search filter and the value represents the rank of the corresponding search filter. In some embodiments, the key may represent a label and the value represents the rank of the corresponding label. In some embodiments, the key may represent a label in conjunction with a search filter, while the value represents the rank of the label and search filter combined. Furthermore, some nodes in hierarchical tree structure 502 may share a common position having an equal "rank." In some cases, if two nodes have an equal rank, then selection of either node may be performed within penalty to the search result relevance.

In some embodiments, hierarchical tree structure 502 may be a predetermined tree structure (e.g., the hierarchy of search filters and/or labels may be fixed). In other embodiments, hierarchical tree structure 502 may be a dynamic tree structure (e.g., the hierarchy of search filters and/or labels may change over time). As an example, hierarchical tree structure 502 may be based on previously submitted queries and/or user behavior such that the hierarchy of search filters (e.g., search filter scores, ranks, etc.) may fluctuate based on changing user patterns. For example, when other users submit queries, certain search filters and/or labels that are searched more often may have a higher weight (e.g., higher importance level) while other search filters and/or labels that are searched for less often may have a lower weight. In such a scenario, one or more calculations may be performed based on the search filters provided in previously submitted search queries, and their associated labels/tags to determine their relative rank. For example, if "Label_1" and "Filter 1" are searched for more often than "Label_2" and "Filter 2", then "Label_1" and "Filter_1" may be associated with a higher rank. In some embodiments, "Label_1" and "Filter 1" may be ranked separately such that "Label_1" is searched more often, but "Filter_1" is not searched for as often. In such a case, model subsystem 214 may determine that "Label_1" should have a higher rank but "Filter 1" should have a lower rank. In such a case, a rank of "Label_1" and a rank of "Filter 1" may be combined (e.g., averaged, weighted combination, etc.) to determine their overall rank. As another example, where the labels are only considered, "Label 1" may be searched for more often than "Label 2" thus, model subsystem 214 may determine "Label 1" should have a higher rank than "Label 2." Additionally, where the filters are only considered, "Filter 1" may be searched for more often than "Filter 2" thus, model subsystem 214 may determine that "Filter 1" should have a higher rank than "Filter 2." Although the terms "Label 1," "Label 2," "Filter 1," Filter 2", and so on are used, the numeric value tied to the labels/filters as indicated above are not meant to indicate order of the search filters in a search query, but rather distinguish between two labels and/or filters of a set of labels and/or filters included in a same query.

In some embodiments, hierarchical tree structure 502 may represent a degenerate tree structure such that node 502a has the highest rank as compared to all other nodes 502b-502n.

In other embodiments, the hierarchical tree structure may represent a degenerate tree structure such that node 502a has the lowest rank as compared to all other nodes 502b-502n. Nonetheless, other types of tree structures may be represented as hierarchical tree structure 502 as known in the art (e.g., a tree structure, a linked-list, degenerate tree structure, digital tree structure, etc.).

Figure 6:
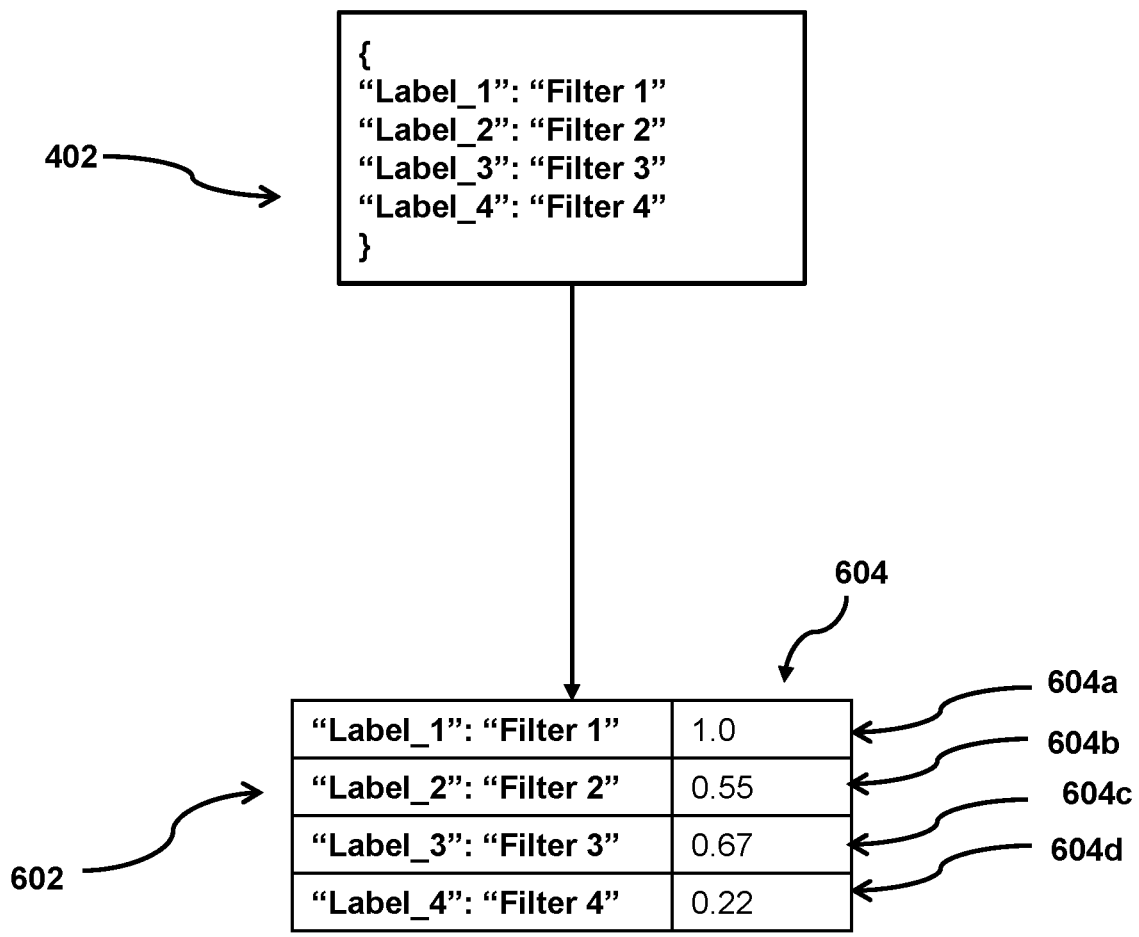
FIG. 6 shows a system for ranking search filters, in accordance with one or more embodiments.

Returning to FIG. 2, in some embodiments, query subsystem 212 may rank (e.g., score) each search filter that may be included in a search query. As an example, query subsystem 212 may obtain a model from model database 236 to determine the rank of each search filter provided in a query and associate the determined rank to each search filter. The search filters, for instance, may be ranked in accordance with the labels associated with them. For example, with respect to FIG. 6, the search filters included in transformed query 402 may be ranked based on a hierarchical tree structure indicating a level of importance of each filter. For example, the ranking scores 604a-604d of each search filter may be a quantitative rank (e.g., a normalized score, raw score, integer, etc.) or a qualitative rank (e.g., higher, lower, etc.). In some embodiments, the rank may be associated with a level of importance of each search filter included in transformed query 402. The rank of search filters may be determined based on a hierarchical tree structure, a tree structure, a linked-list, or other data structures stored in model database 236, or based on a pre-determined rank (e.g., based on historical data, previously submitted queries, etc.) from historical data database 234. In such a scenario where the rank of each search filter is based on a pre-determined rank, the pre-determined rank may be a list, table, or other pre-saved data that includes information about which search filters of the plurality of search filters are weighted greater.

Returning to FIG. 2, in some embodiments, query subsystem 212 may select, from the plurality of search filters (e.g., the set of vehicle feature filters), a first search filter (e.g., a vehicle feature filter) based on a hierarchical tree structure of search filters. For instance, the hierarchical tree structure of search filters may indicate that a first search filter has a higher rank than each other search filter of the plurality of search filters included in a given query. For example, referring back to FIG. 6, first search filter 104 may be selected based on a first ranking score 604a, which is greater than ranking scores 604b-604d of the other search filters. For instance, first ranking score 604a indicates that first search filter 104 has a higher rank than each of second ranking score 604b, third ranking score 604c, and fourth ranking score 604d. Although only four search filters are shown in first query 602, it should be noted that first query 602 may have fewer or more search filters than shown in first query 602. Additionally, although the ranking scores 604a-604d are shown as a numeric rank, it should be noted that ranking scores 604a-604d may also represent other quantitative values (e.g., integers, decimals, floating point values, percentages, etc.) and qualitative values (higher, lower, highest, lowest, more, less etc.).

Returning to FIG. 2, in some embodiments, query subsystem 212 may be configured to generate a second query including the selected first search filter and one or more other search filters of the plurality of search filters. The one or more other search filters may be selected based on a frequency with which previously submitted queries included both the first search filter and each other search filter of the plurality of search filters. In some embodiments, the second query may include fewer search filters than the first query. In some embodiments, the one or more other search filters may be different than the plurality of search filters. For example, semantically similar search filters, related search filters, or other commonly searched filters may be used.

Figure 7A:
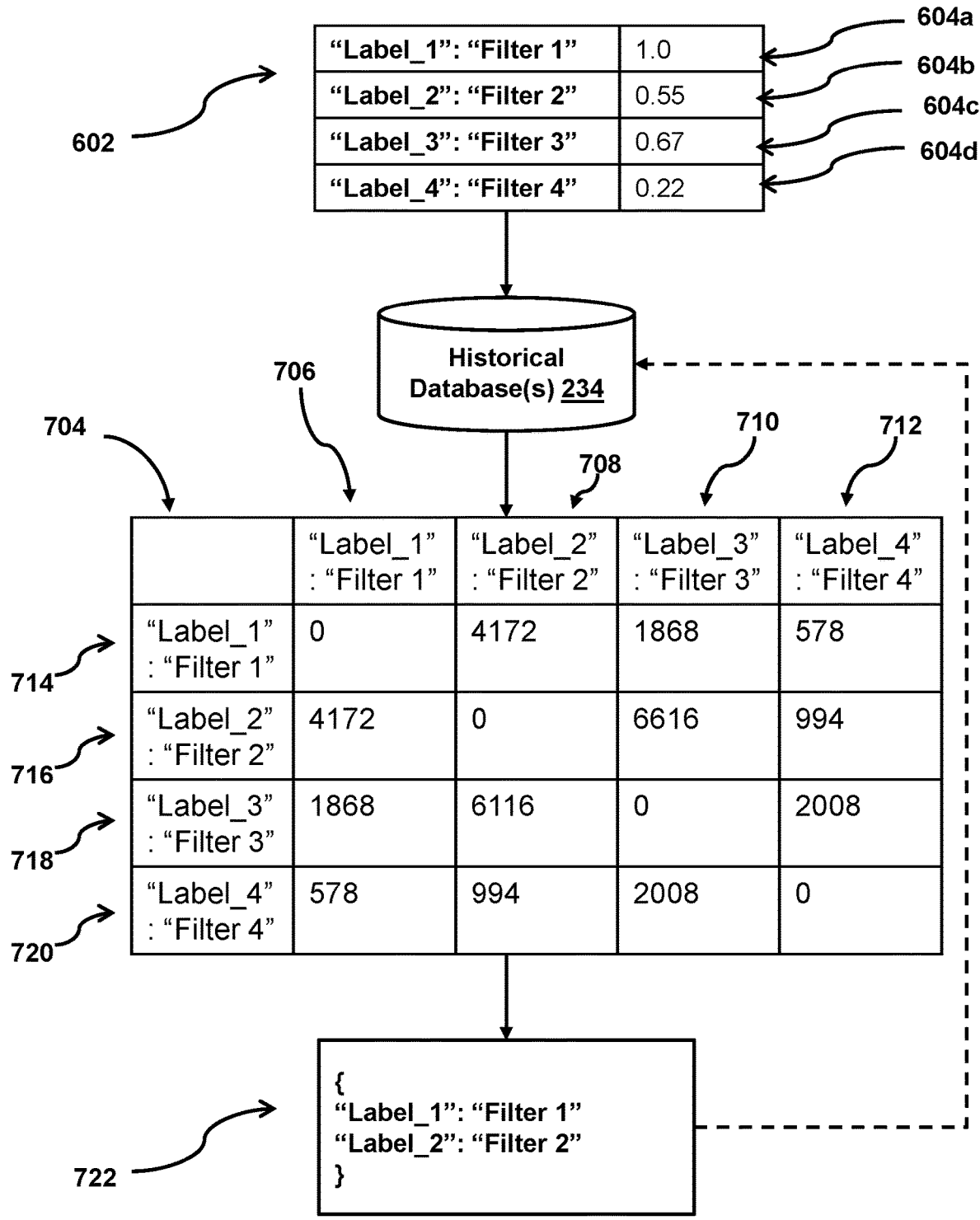
FIG. 7A shows a system for generating a query from ranked search filters, in accordance with one or more embodiments.

As an example, with respect to FIG. 7A, query subsystem 212 may generate second query 722 by accessing historical database 234 and obtaining table 704. For instance, historical database 234 may include historical data of previously submitted queries from users searching for vehicles or other products. This historical data may be used to generate or obtain table 704. In some embodiments, table 704 may represent a co-occurrence matrix (e.g., a matrix that indicates frequencies with which pairs of filters are included in a same query) that can be used for determining which search filters of the plurality of search filters are most commonly co-searched. Search filters that are searched for together, such as within a same query, are referred to as "co-searched" filters. It should be noted that although table 704 shows four search filters (e.g., filters 706-712), table 704 may be extended to cover some or all possible search filters. Additionally, it should also be noted that search filters 706-712 may correspond to search filters 104-110, respectively. Likewise, search filters 714-720 may also correspond to search filters 104-110, respectively. However, in other embodiments, search filters 706-712 and 714-720 may correspond to different search filters. In some embodiments, search filters 714-720 may all correspond to the same search filter (e.g., first search filter 104) while search filters 706-712 correspond to search filters 106-110, respectively.

Query subsystem 212 may select one or more of search filters 706-720 to be included in second query 722 based on a frequency with which previously submitted queries included the first search filter and each of search filters 706-720. For instance, query subsystem 212 may use the selected first search filter 104 to perform a table lookup via table 704, which may be based on historical query data. For example, based on the ranking scores 604a-604d, the first search filter (e.g., "Filter 1" with corresponding label "Label_1") may be selected based on the first search filter's rank as described above, and the first search filter may correspond to first search filter 104. The table lookup may determine which search filter of the plurality of search filters is searched most frequently with first search filter 104. For example, query subsystem 212 may determine based on historical query data obtained from historical database 234, a frequency with which a filter (e.g., search filters 706-720) is included with the first search filter (e.g., first search filter 104) that is greater than other frequencies of the other filters (e.g., search filters 706-720). It should be noted, that although table 704 shows integer values for the frequencies in which search filters are searched together with other search filters, the frequencies may be represented as floating point values, percentages, scores, or other metric for representing how often search filters are co-searched with other search filters.

With respect to FIG. 7A, query subsystem 212 may select a second search filter to be included in a second query based on having a frequency that is higher than all other frequencies. For instance, the second search filter may be selected based on having the highest frequency with which previously submitted queries included the first search filter (e.g., first vehicle feature filter) and each other search filter (e.g., one or more other co-filters). As an example, query subsystem 212 may perform a column lookup based on the selected search filter (in this case, first search filter 706) and may then perform a row lookup to determine which search filter has the greatest frequency of being searched therewith. For example, second search filter 716 may be searched with first search filter 706 more frequently than each of the other search filters are searched with first search filter 706. In other embodiments, query subsystem 212 may perform a row lookup based on the selected search filter and will then perform a column lookup to determine which search filter has the highest frequency, and vice versa. As another example, query subsystem 212 may perform a column lookup based on which search filter has the highest rank (in this example, first search filter 706) and will then perform a row lookup to determine which search filter has the highest frequency (in this example, second search filter 716). In other embodiments, query subsystem 212 may perform a row lookup based on which search filter has the highest rank and will then perform a column lookup to determine which search filter has the highest frequency, and vice versa.

In some embodiments, multiple tables that are the same or similar to table 704 may be obtained and used to determine search filters to be added to a query based on their respective frequencies of being co-searched. For example, in the case where a search query has two search filters, and a third search filter is to be added, multiple tables (e.g., the same or similar to table 704) may be obtained and combined in order to add the third search filter. For example, query subsystem 212 may use the two search filters included in the search query separately to obtain multiple tables (one for each of the two search filters included in the search query) from historical database 234. After the multiple tables are obtained, the scores (e.g., frequencies) included in each entry of the tables can be averaged together (row-wise, column-wise, etc.) to select the third search filter to be included in the search query.

In some embodiments, the process described above of selecting search filters to be added to the search query (e.g., to generate second query 722) based on their frequencies of being co-searched may be repeated iteratively to build a search query including at least one fewer search filters. For example, first query 102 may have N search filters, where N represents the number of search filters included in the first query. Upon selecting the first search filter based on the first search filter having the highest rank as compared to all other search filters included in the first search query, table 704 may be accessed to add a second search filter based on having the highest frequency of being co-searched with the first search filter. Thus, the first query is updated to include the first search filter and the second search filter. In the next iteration, multiple tables that are similar to or the same as table 704 may be obtained to account for the first and second search filters included in the updated query. For instance, a first table that is the same or similar to table 704 may be obtained to determine which search filter is most co-searched with the first search filter in the updated query, and a second table that is the same or similar to table 704 may be obtained to determine which search filter is most co-searched with the second search filter in the updated query. After the tables are obtained, the scores of corresponding entries in the tables may be combined (e.g., averaged, weighted combination, maxpooling, minpooling, etc.) to determine a third search filter to add to the search query, thereby updating the search query again. In some embodiments, this process may be repeated until the first search query has N−1 search queries included in the updated search query. For example, in the case of a weighted average, the first search filter's rank may act as a weight for the average and may be weighted higher than the second search filter in the case that the second search filter's rank is lower than the first search filters rank. In this way, the first search query may be built up in order to provide better search results for the user, thereby reducing the chance of returning search results that do not satisfy a threshold condition (e.g., null search results).

In some embodiments, subsequent to query subsystem 212 selecting the search filter that is searched most frequently with the first search filter, query subsystem 212 may generate second query 722. Although the above example indicates that only one search filter is selected (e.g., second search filter 708), it should be noted that additional search filters may also be selected. For example, third search filter 710 may also be selected based on third search filter 710 being associated with the second highest frequency of search filters 706-712. In some embodiments, query subsystem 212 may cause a second search to be performed based on the second query. In some embodiments, second query 722 may correspond to second query 118, and a user may be unaware that a modified query (e.g., second query 118) has been generated based on the original query (e.g., first query 102). Referring back to FIG. 1, a user may only be aware of the steps taken/shown to the left of the dashed line, and the user may be unaware of the steps taken to the right of the dashed line. In this way, user frustration of receiving null search results may be avoided. Furthermore, in some embodiments, second query 722 may include fewer search filters than what first query 102 originally had, thereby forming an optimized filter that reduces client-server network traffic when accessing a database to obtain vehicle availability results, such as when accessing vehicle availability database 232. In some embodiments, query subsystem 212 may submit a request for the performance of a second search via a second API request including the second query 722. In response to the second API request, user interface subsystem 218 may generate a user interface including search results in response to the second search and provide data for rendering the user interface to a client device. For example, a user interface including the search results (e.g., first search result 126, second search result 128, third search result 130, etc.) in response to the second search may be generated and data for rendering the user interface may be provided to client device(s) 204a-204n. In some embodiments, when the second search is performed, query subsystem 212 may access vehicle availability database 232 via an application programming interface (API) request that includes second query 722 (e.g., a second vehicle availability query). Upon accessing vehicle availability database 232, user interface subsystem may generate search results (e.g., first search result 126, second search result 128, and third search result 130 indicating vehicles) returned from the access via the second API request and provide the user interface to client device(s) 204a-204n.

In some embodiments, results subsystem 216 may identify that the second search returns fails to satisfy a threshold results condition or the second search returns a null set of search results and may indicate to query subsystem 212 to identify a search filter that indicates a location range. For example, query subsystem 212 may identify a search filter of the one or more search filters included in the second query that indicates a location range and generate a third query by increasing the location range. For instance, a search filter (e.g., fourth search filter 110) may represent a location range. The location range may be a search radius, geographic location, country, state, GPS coordinate range, or other geographic range. In an effort to provide non-null search results, query subsystem 212 may increase or otherwise change the location range thereby generating a third query. In this way, a user may be provided search results if the original query (e.g., first query 102, second query 118, other queries) produced null search results or otherwise failed to meet a threshold results condition.

In some embodiments, when queries are submitted, geographical location data may be associated with a client device that is submitting the search query. As an example, when users submit queries from a client device (e.g., client device 204), geographical location data such as GPS coordinates (or other data indicating a location, such as, but not limited to cell tower information, Internet Protocol (IP) addresses, etc.) may be associated with the client device. The geographical location data may be used such that when queries that are submitted specify a location range or location radius as a search filter a user is seeking to find a product/vehicle for purchase, the geographical location data can also be considered with the specified location range. The location data may also be associated with a geographical radius in miles, kilometers, meters, or other metric measuring distance. For instance, vehicles and/or products that are available for purchase in one location may not be the same as vehicles and/or products that are available for purchase in another location. As an example, in some embodiments, a user may submit a query that indicates a location range/search radius that the user would like to find a vehicle in. The geographical location data associated with the client device may be used to determine the location of the user submitting the query and the location range/search radius may be used to find vehicles nearby the user's location that are relevant to one or more other search filters included in the query specifying vehicle features that the user prefers. A search may be performed to find vehicles that conform to the search filters provided in the query and also the search radius the user has provided to find such vehicles. If a threshold condition of search results from the search failed to satisfy a threshold results condition or returned a null set of search results, the location range/search radius may be increased to find vehicles available for purchase that conform to the one or more other search filters included in the query specifying vehicle features that the user prefers.

Figure 7B:
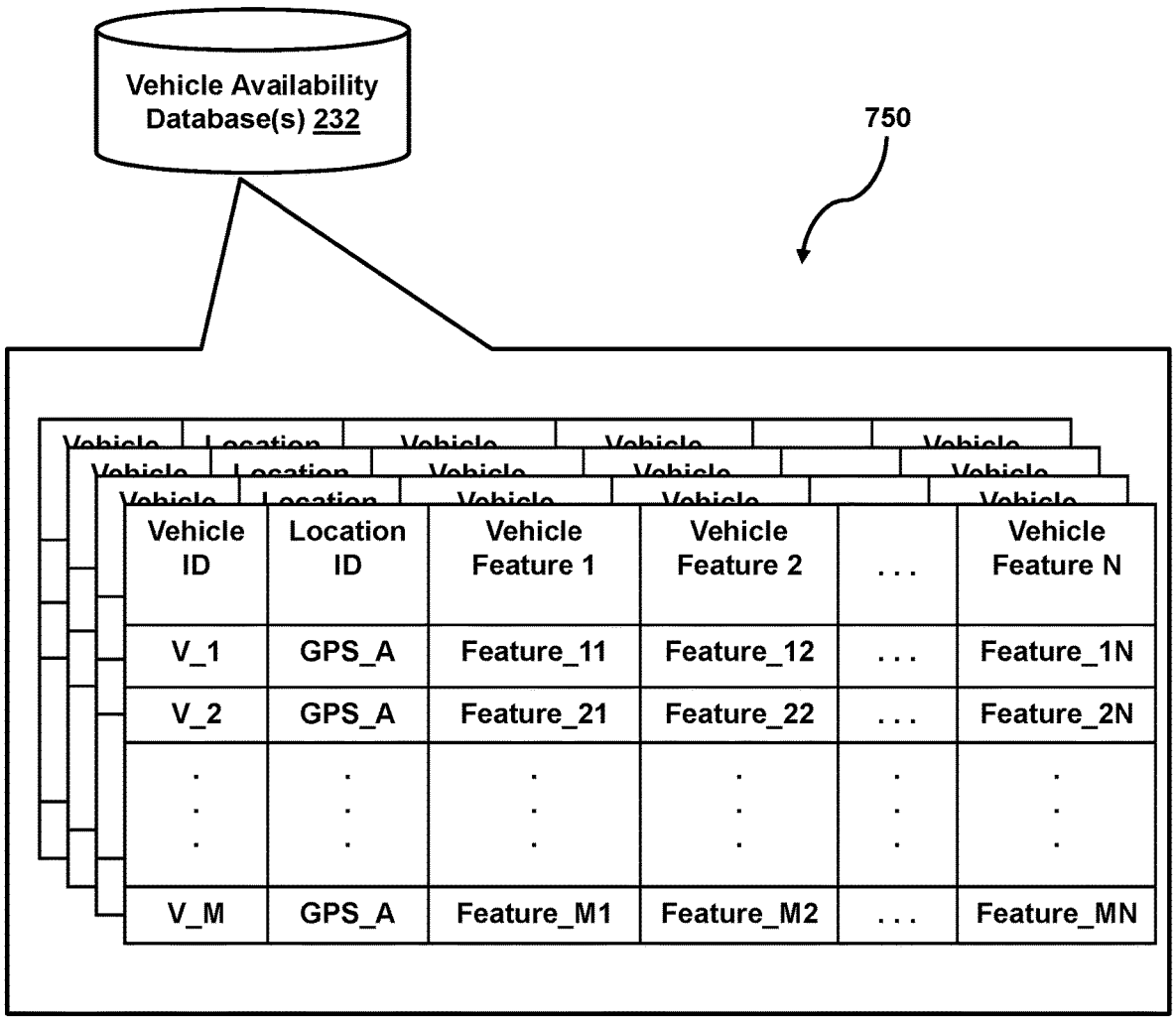
FIG. 7B shows a database storing vehicle availability information, in accordance with one or more embodiments.

Referring to FIG. 7B, vehicle availability database 232 may store a table 750 including vehicle availability information related to vehicles that are available for purchase. Table 750 may be stored in separate tables and/or other data formats that include the location of vehicles to be purchased, the vehicle features that a particular vehicle is associated with, vehicle identification numbers, and other information. For instance, the location of vehicles to be purchased may be represented as the "Location ID" in Table 750. The "Location ID" may represent a location that a particular vehicle is located such as, but not limited to, GPS coordinates, a county, city, state, country, or other geographical identifier. In some embodiments, vehicle table 750 may include one or more tables associated with a particular location (e.g., a vehicle dealership location). For example, one table may be associated with one geographical location (e.g., a dealership location) such that one table may represent a vehicle dealership located in a geographical area, and another table may represent another vehicle dealership located in another geographical area. Thus, one table may represent vehicles available for purchase at a particular location. In this way, each search result, which may correspond to a particular vehicle available for purchase, may be associated with a particular location. In some embodiments, however, one table may include multiple location data. For example, a dealership may be associated with multiple locations and the vehicles that the dealership "owns" may be spread out across multiple locations. Therefore, one table may include vehicles that are available for purchase for a particular dealership and the vehicles that the dealership has available may be spread across multiple locations. Although FIG. 7B is described as being associated with vehicles (e.g., vehicle availability database 232), it should be noted that vehicle availability database 232 is for illustrative purposes and that any product a user is seeking to purchase may be associated with the database and is not merely limited to vehicles.

In some embodiments, in response to results subsystem 216 determining that the results returned from the second search failed to satisfy a threshold results condition or returned a null set of search results, a location range (e.g., search radius) may be increased. For example, query subsystem 212 may identify a search filter included in the second query that indicates a location range and generate a third query by increasing the location range of the search filter. For instance, query subsystem 212 may parse through the search filters included in the second query to identify a search filter that is associated with a location range. In some embodiments, after query subsystem 212 identifies a search filter that is associated with a location range, query subsystem may then access vehicle availability database 232 to identify a vehicle that is geographically close to the location range indicated in the second query and that adheres to the search filters provided in the second query. For instance, query subsystem 212 may use the second query to identify vehicles available for purchase that conforms to the search filters in the second query by searching through vehicle table 750. Once query subsystem 212 identifies a vehicle (or a set of vehicles), query subsystem may perform one or more distance calculations between the "Location ID" of a particular vehicle for purchase in vehicle table 750 and the geographic location data associated with the client device submitting the query to determine a vehicle for purchase that is nearby. Once the closest distance is found, query subsystem 212 may update the second query and generate a third query by increasing the location range such that the increased location range includes the geographic area where the identified vehicle will appear in future search results. For example, if the second query has a first search filter, second search filter, and a third search filter where the third search filter indicates a search radius of 5 miles from the current user location, query subsystem 212 may access vehicle table 750 to identify a set of vehicles that conform to the first and second search filter. Once query subsystem 212 has identified a set of vehicles conforming to the first and second search filter, query subsystem 212 may perform one or more distance calculations between the current location of the client device (e.g., current location of the user) and the "Location ID" of the identified set of vehicles. For instance, a first vehicle and a second vehicle may be identified that conform to first and second search filters, and the first vehicle may be 7 miles away from the user's current location, and the second vehicle may be 50 miles away from the user's current location. Thus, query subsystem 212 may update the second query to generate a third query to include the first search filter, the second search filter, and the third search filter indicating an updated search radius of 10 miles. In this way, but updating the search radius to 10 miles, the first vehicle that is 7 miles away may be included in future search results. Subsequent to generating the third query, query subsystem 212 may submit a request for the performance of a third search via a third API request including the third query. In response to the third API request, user interface subsystem 218 may generate a user interface including search results in response to the third search. In this way, the first vehicle identified (e.g., the first vehicle that is 7 miles away) may be included in the search results. Furthermore, in this way, client-server network traffic may be reduced because a user will obtain search results for a vehicle they would like to purchase and not be required to resubmit multiple queries that would not produce search results.

In some embodiments, results subsystem 216 may determine that the second search fails to satisfy a threshold results condition, and may indicate to query subsystem 212 to generate a third query by removing a search filter from the second query. In this way, the search query will be broadened in hopes to return more search results when searched with the updated query. In some embodiments, a search filter may be removed from the second query based on having a value that is less than a value of another search filter. For instance, query subsystem 212 may obtain a model from model database 236 to determine the rank of each search filter included in the second query. Once query subsystem 212 has obtained each search filter's rank, query subsystem 212 may compare each search filter's rank to one another to determine which search filter included in the second query has the lowest rank. As an example, a search filter may have a rank that is lower than another search filter's rank. Query subsystem 212 may then update the second query by removing the search filter that has the lowest rank and generate the third query based on the updated second query. In such a scenario, the removed search filter is deemed less important than the other search filter and is removed from the second query, thereby generating the third query. Nevertheless, in this way, the generated third query may provide a broader search query by removing one or more search filter thereby returning broader search results (e.g., more search results) as compared to the second query.

In some embodiments, query subsystem 212 may obtain historical query data and identify a search filter to be removed that is included in the second query to generate a third query. For example, results subsystem 216 may determine that the results returned from the second search did not include any search results (e.g., null search results) or that a threshold results condition was not satisfied. In some embodiments, query subsystem may then obtain historical query data indicating frequencies of which pairs of search filters (e.g., co-filters) are included in a same query. As an example, query subsystem 212 may provide the second query to database 230 and retrieve table 704 from historical data database 234. In some embodiments, more than one table may be retrieved and the tables may represent co-occurrence matrices. As an example, the values included in table 704 may represent frequencies of which pairs of search filters are included in a same query. In one use case, it can be shown that first search filter 714 and second search filter 708 were searched together in a same query 4172 times. Although the values shown in table 704 are integer values representing raw data of how frequently one or more search filters are searched together, it should be noted that the values may also be in the form of percentages, floating point values, scores, normalized scores and so on. The values currently shown in table 704 are for illustration purposes per the examples explained herein. Continuing with the example, based on table 704, query subsystem 212 may identify, based on the historical query data, a search filter to be removed from the second query based on being co-searched with the one or more other search filters included in the second query the least. In one use case, fourth search filter 712 may be removed from the second query based on being searched with the first search filter 714 the least, thereby generating the third query. In some embodiments, more than one search filter may be removed at a time. For example, with respect to FIG. 7A, if second query includes search filters 706-712, query subsystem may determine that search filters 718-720 should be removed from the second query based on search filters 718-720 having the lowest frequencies of being searched together with the first search filter 706, thereby generating the third query. It should be noted that, in some embodiments, search filters 706-712 may correspond to search filters 104-110 (FIG. 1), respectively, and search filters 714-720 may correspond to search filters 104-110 (FIG. 1), respectively, as well. In some embodiments, search filters 706-712 may correspond to either one of search filters 104-110 (FIG. 1) (e.g., each search filter 706-712 correspond to first search filter 104, second search filter 106, and so on) while search filters 714-720 correspond to search filters 104-110 (FIG. 1), respectively. Furthermore, in some embodiments, search filters 706-712 and search filters 714-720 may correspond to other search filters that are not search filters 104-110 (FIG. 1).

Figure 8:
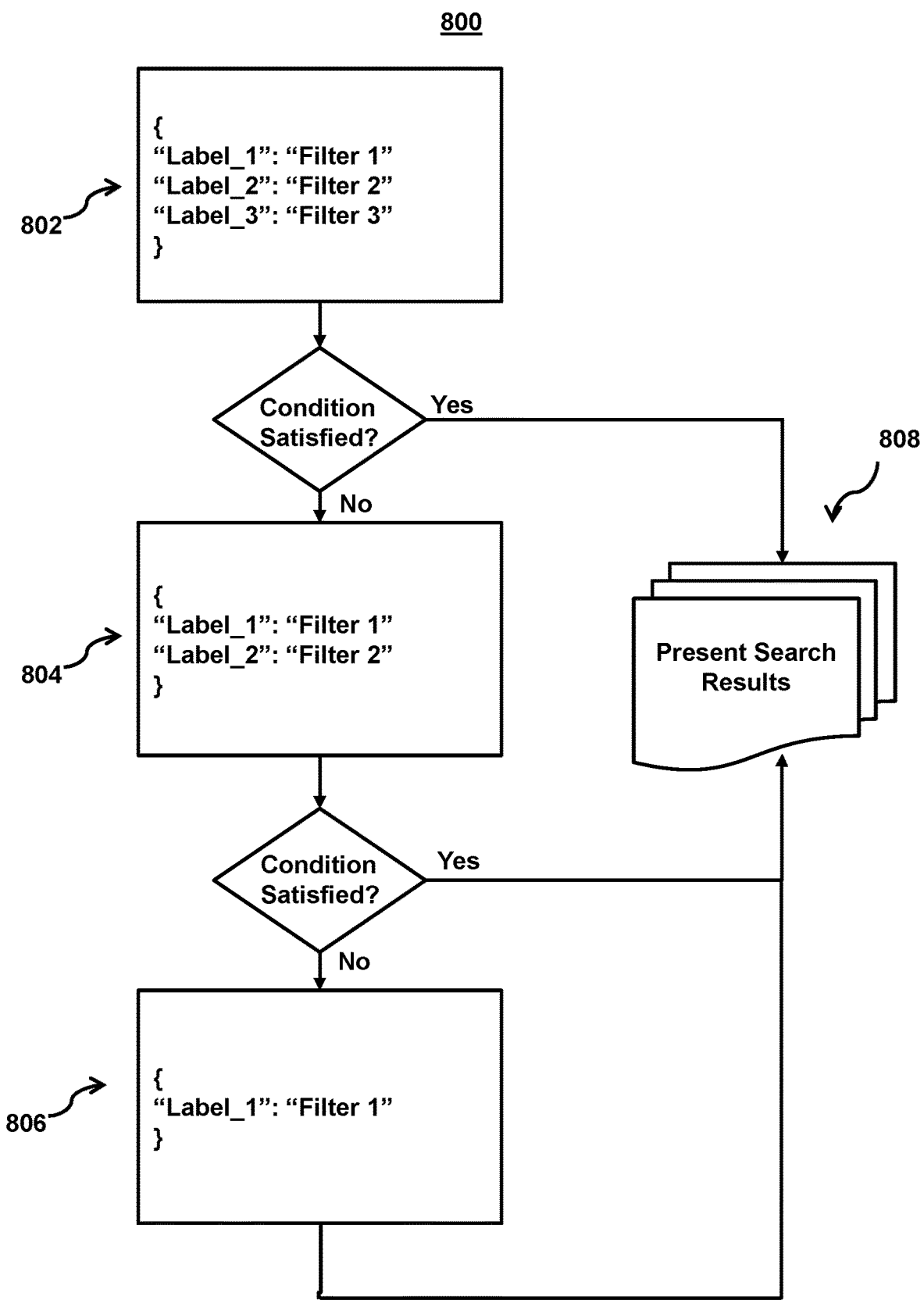
FIG. 8 shows a system for generating a query to produce non-null search results, in accordance with one or more embodiments.

In some embodiments, search filters may be removed iteratively based on whether the search results obtained for a given query satisfy a threshold condition. For example, with respect to FIG. 8, process 800 shows a method for updating queries by removing search filters. As an example, search query 802 may be considered an original search query that a user has provided or a transformed query (e.g., transformed into a QL query). Search query 802 may include a plurality of search filters such as first search filter, second search filter, and third search filter. In some embodiments, a search may be performed using search query 802, and results subsystem 216 may determine whether the search results obtained from the search satisfy a threshold condition. In some embodiments, the threshold condition may be satisfied if the number of search results obtained is greater than a threshold number of search results (e.g., 10 or more search results, 100 or more search results, etc.). If the threshold condition is not satisfied (e.g., less than the number of search results to satisfy the condition or the search returned a null set of search results), query subsystem 212 may be configured to remove one or more search filters to generate search query 804. In some embodiments, query subsystem 212 may remove one or more search filters based on a search filter having a value (e.g., rank) that is lower than the other search filters included in query 802. In some embodiments, query subsystem 212 may remove one or more search filters based on being co-searched the least amount of times (e.g., less frequently) with respect to the other search filters included in query 802. Once the one or more search filters are removed, search query 804 may be generated based on the removal of the one or more search filters of query 802. After search query 804 has been generated, a search may be performed using search query 804, and results subsystem 216 may determine whether the search results obtained from the search satisfy a threshold condition. If the threshold condition is not satisfied, query subsystem 212 may be configured to remove one or more search filters to generate search query 806. In some embodiments, query subsystem 212 may remove one or more search filters based on a search filter having a value (e.g., rank) that is lower than the other search filters included in query 804. In some embodiments, query subsystem 212 may remove one or more search filters based on being co-searched the least amount of times (e.g., less frequently) with respect to the other search filters included in query 804. Once the one or more search filters are removed, search query 806 may be generated based on the removal of the one or more search filters of query 802. After search query 806 is generated, a search may be performed using search query 806 and the search results may be presented to the user. In this case, search query 806 only has one search filter remaining. However, it should be noted that search query 806 (as well as search query 802 and 804) may have more search filters than pictured, and FIG. 8 is not intended to be limiting. However, in this example, because search query 806 only has one search filter remaining, it cannot be removed. As such, if no search results are obtained with respect to search query 806, the last filter remaining may be altered or otherwise changed in order to present non-null search results in accordance with one or more embodiments previously described.

Figure 9:
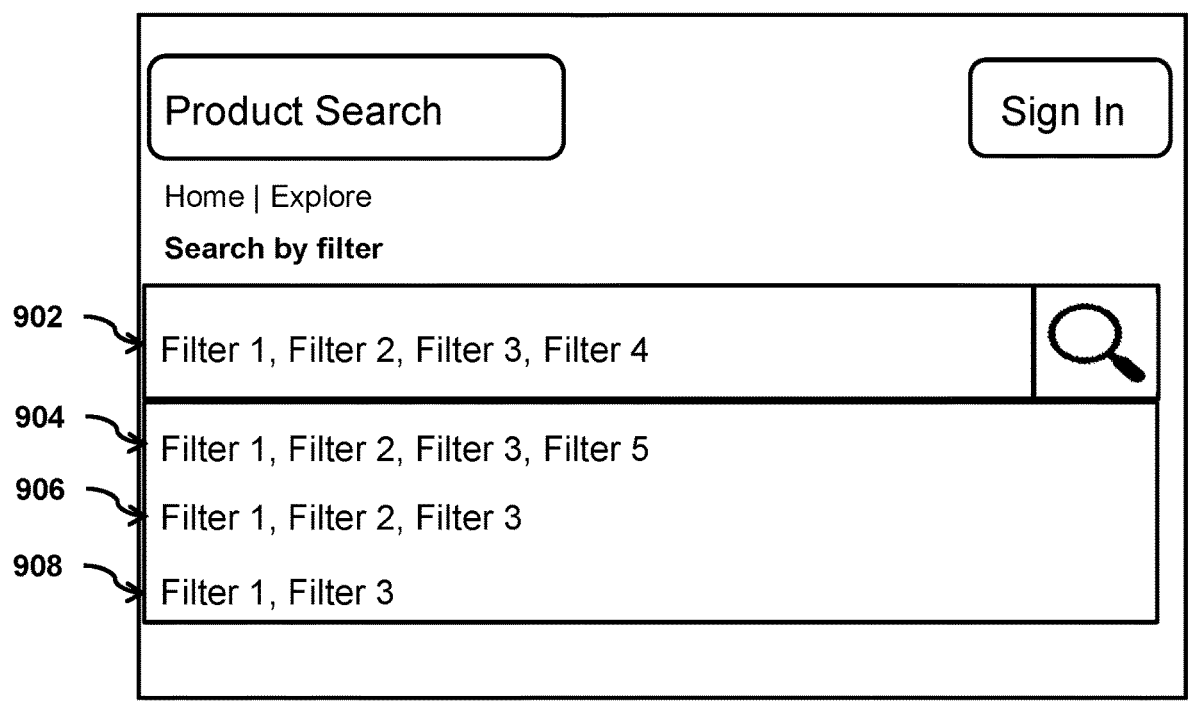
FIG. 9 shows a user interface with suggested search filters based on previously submitted queries, in accordance with one or more embodiments.

In some embodiments, user interface subsystem 218 may generate a user interface and provide data for rendering the user interface to a client device. For example, with reference to FIG. 9, a user interface 900 is presented including suggested search queries based on previously submitted queries. For example, a user may interact with user interface 900 to begin searching for a product or one or more vehicles they wish to purchase. For instance, a user may input a search query related to a product and/or vehicle the user would like to purchase. In this case, search query 902 includes four search filters such as first filter, second filter, third filter, and fourth filter. As shown in FIG. 9, user interface subsystem 218 may generate or otherwise provide suggested search queries (e.g., search query 904, search query 906, and search query 908) based on search query 902 and previously submitted queries. For example, search query 902 may include four search filters (e.g., first filter, second filter, third filter, and fourth filter). As an example, in the context of searching for a vehicle the user would like to purchase, first filter, second filter, third filter, and fourth filter may correspond to the "make," "model," "exterior color," and "search radius," respectively. In order to provide the user with suggested search queries based on search query 902 that the user is inputting, historical data database 234 may be accessed to search for previously submitted queries that are similar to search query 902. For example, query subsystem 212 may search through historical data database 234 to find a previously submitted query that is similar to search query 902 to provide suggested search queries 904-908. For instance, query subsystem 212 may compare search query 902 to previously submitted query data stored in historical data database 234 to find a similar search query. A feature vector including attributes characterizing the previously submitted queries may be generated, and a similarity may be computed between the feature vector for query 902 and some or all the feature vectors for the previously submitted queries. For example, a similarity score may be computed based on an L2 distance between a feature vector for search query 902 and the previously submitted query vectors. If any of the similarity scores satisfy a threshold similarity score (e.g., a similarity score greater than or equal to 0.75, a similarity score greater or equal to 0.80, a similarity score greater than or equal to 0.90), then the previously submitted queries associated with those vectors may be presented to the user as suggested search queries 904-908. Although only four search filters are shown in search query 902, it should be noted that search query 902 (and likewise search query 904, search query 906, and search query 908) may have fewer or more search filters.

Example Flowchart

Figure 10:
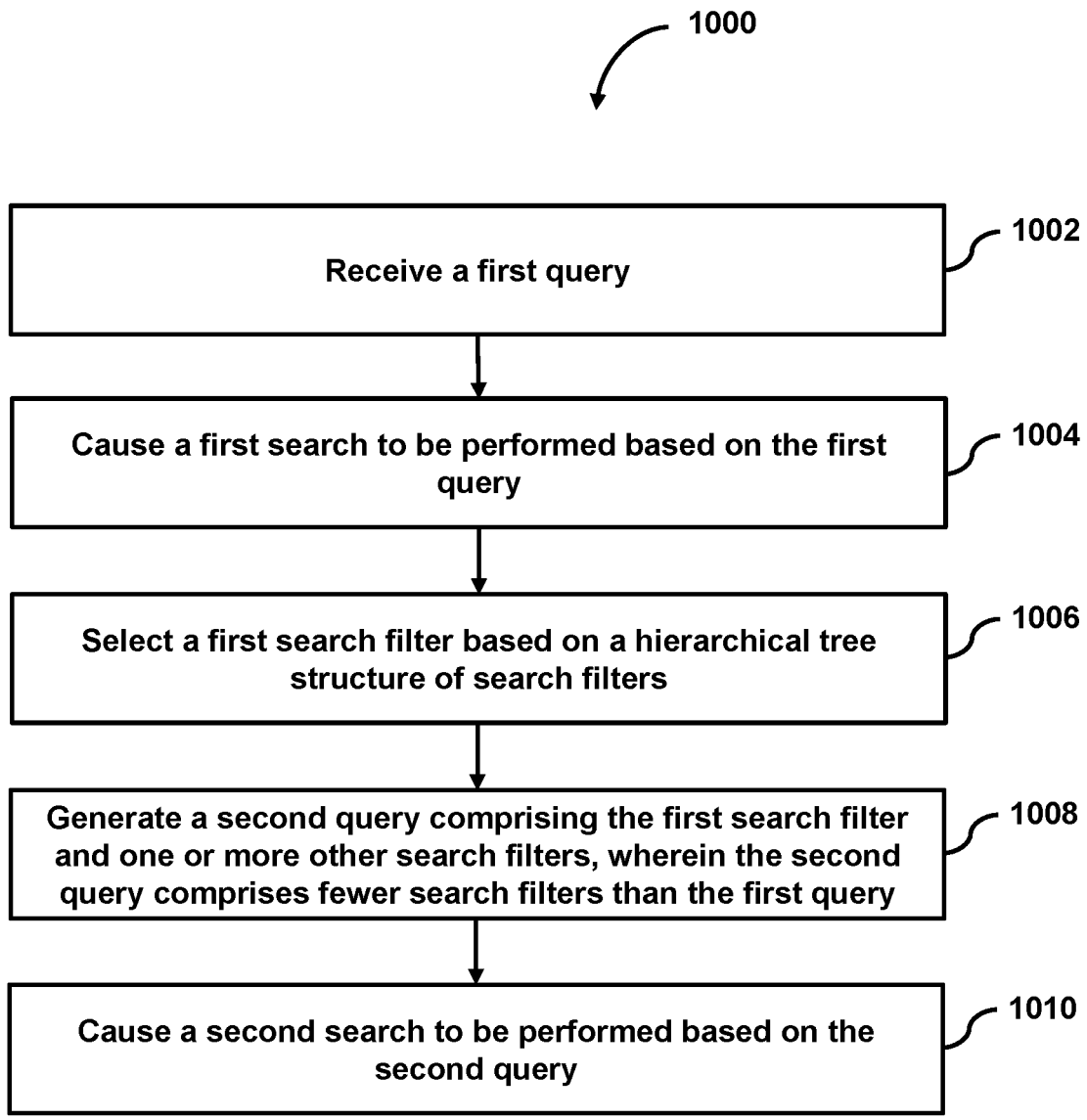
FIG. 10 shows a flowchart of a method to reduce client-server network traffic, in accordance with one or more embodiments.

FIG. 10 is an example flowchart of processing operations of methods that enable the various features and functionality of the system as described in detail above. The processing operations and the method presented below are intended to be illustrative and non-limiting. In some embodiments, for example, the method may be accomplished with one or more additional operations not described, and/or without one or more of the operations discussed. Additionally, the order in which the processing operations of the method is illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 10 shows a method 1000 for reducing client-server network traffic, in accordance with one or more embodiments. In operation 1002, a first query may be received. The first query may include a plurality of search filters. As another example, the system may receive a first availability query including a set of vehicle feature filters. For instance, the first query may include a plurality of search filters related to an item. For example, the first query may be a first vehicle availability query including a set of vehicle feature filters relating to a vehicle that a user wants to purchase or obtain additional information about. In some embodiments, operation 1002 may be performed by a subsystem that is the same or similar to query subsystem 212.

In operation 1004, a first search may be performed based on the first query. For example, a data structure storing vehicle availability data may be accessed via a first application programming interface (API) request including the first vehicle availability query. For instance, the first search may access a database storing data related to vehicles a retailer may have in stock. In some embodiments, the first search may return a null set of search results (e.g., no vehicles matching the description of the search filters). In response to the first search (e.g., the access via the first API request) returning a null set, operations 1006-1010 may be performed. In some embodiments, operation 1004 may be performed by a subsystem that is the same or similar to query subsystem 212.

In operation 1006, a first search filter may be selected based on a hierarchical tree structure of search filters. In some embodiments, a first search filter may be selected from among a plurality of search filters based on a hierarchical tree structure of search filters, wherein the hierarchical tree structure of search filters indicates that the first search filter has a higher rank than each other search filter of the plurality of search filters. As an example, a first vehicle feature filter may be selected from a set of vehicle feature filters based on a hierarchical tree of vehicle feature filters indicating that the first vehicle feature filter has a higher rank than other vehicle feature filters. Thus, the first vehicle feature may be selected based on the first vehicle feature filter's rank being higher than a rank of other vehicle feature filters of the set of vehicle feature filters. In some embodiments, operation 1006 may be performed by a subsystem that is the same or similar to query subsystem 212.

In operation 1008, a second query may be generated including the first search filter and one or more other search filters, where the second query includes fewer search filters than the first query. For example, the system may generate a second query including the first search filter and one or more other search filters of the plurality of search filters, wherein the one or more other search filters are selected based on a frequency (e.g., integers, decimals, floating point values, percentages, etc.) with which previously submitted queries included the first search filter and each other search filter of the plurality of search filters, wherein the second query includes fewer search filters than the first query. In some embodiments, historical query data indicating frequencies with which pairs of co-filters are included in a same query (e.g., vehicle features that are searched for together) may be retrieved. Based on the historical query data, a determination may be made that first frequencies (e.g., integers, decimals, floating point values, percentages, etc.) with which first co-filters (e.g., vehicle features) of the set of vehicle feature filters are included with the first vehicle feature filter in queries are greater than other frequencies in which other co-filters of the set of vehicle feature filters are included with the first vehicle feature filter in queries. As an example, a second vehicle availability query including the first vehicle feature filter and one or more co-filters may be generated, wherein the one or more co-filters are selected based on frequencies with which previously submitted queries included the first vehicle feature filter and each co-filter of the first co-filters being greater than frequencies with which other co-filters are included in queries. In some cases, a total number of vehicle feature filters in the second vehicle availability query is less than a total number of vehicle feature filters in the first vehicle availability query to form an optimized filter that reduces client-server network traffic when accessing the data structure. In this way, a technical benefit of reducing client-server network traffic is achieved by a technical solution of generating a query with (i) vehicle feature filters that are more likely to produce non-null search results (thereby reducing the amount of times a user may search a database for a vehicle that may or may not exist because the first query was too specific) and (ii) less data to be sent over a network (because the query has fewer features). In some embodiments, operation 1008 may be performed by a subsystem that is the same or similar to query subsystem 212 and/or model subsystem 214.

In operation 1010, a second search may be performed based on the second query. For instance, a data structure (e.g., database storing data related to which vehicles a retailer may have in stock) may be accessed via a second API request including the second vehicle availability query. Furthermore, a user interface to be provided to the client device may be generated, where the user interface includes results (e.g., vehicles matching the features specified in the second vehicle availability query) returned from the access via the second API request. In some embodiments, operation 1010 may be performed by a subsystem that is the same or similar to query subsystem 212 and/or user interface subsystem 218.

In some embodiments, the various computers and subsystems illustrated in FIG. 2 may include one or more computing devices that are programmed to perform the functions described herein. The computing devices may include one or more electronic storages (e.g., database(s) 230, which may include vehicle availability database(s) 232, historical query database(s) 234, model database(s) 236, etc., or other electronic storages), one or more physical processors programmed with one or more computer program instructions, and/or other components. The computing devices may include communication lines or ports to enable the exchange of information with one or more networks (e.g., network(s) 250) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 212-218 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 212-218 described herein is for illustrative purposes, and is not intended to be limiting, as any of subsystems 212-218 may provide more or less functionality than is described. For example, one or more of subsystems 212-218 may be eliminated, and some or all of its functionality may be provided by other ones of subsystems 212-218. As another example, additional subsystems may be programmed to perform some or all of the functionality attributed herein to one of subsystems 212-218.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompasses all such attributes or functions being mapped to all such objects and subsets of the attributes or functions being mapped to subsets of the attributes or functions (e.g., all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified (e.g., with explicit language like "after performing X, performing Y") in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A method, the method comprising: generating a first query comprising a first plurality of search filters based on a second query comprising a second plurality of search filters, wherein the first query further comprises fewer search filters than the second query and wherein the first query returns non-null search results.
2. A method, comprising: receiving a first query comprising a plurality of search filters; causing a first search to be performed based on the first query; and in response to the first search returning a null set: selecting, from the plurality of search filters, a first search filter based on a hierarchical tree structure of search filters; generating a second query comprising the first search filter and one or more other search filters of the plurality of search filters, wherein the second query comprises fewer search filters than the first query; and causing a second search to be performed based on the second query.
3. The method of embodiment 2, wherein: the hierarchical tree structure of search filters indicates that the first search filter has a higher rank than each other search filter of the plurality of search filters; and the one or more other search filters are selected based on a frequency with which previously submitted queries comprise the first search filter and each other search filter of the plurality of search filters.
4. The method of any one of embodiments 2-3, further comprising: determining, based on the hierarchical tree structure, a first value for the first search filter, wherein the first search filter is selected based on the first value for the first search filter being greater than a value of each of the one or more other search filters of the plurality of search filters.
5. The method of any one of embodiments 2-4, further comprising: determining that the second search fails to satisfy a threshold results condition; identifying, based on the hierarchical tree structure, a second search filter of the one or more other search filters included in the second query having a value that is less than a first value of the first search filter; and generating a third query by removing the second search filter from the second query.
6. The method of embodiment 5, wherein the threshold results condition being satisfied comprises a number of search results included in the second search results being less than or equal to a threshold number of search results.
7. The method of any one of embodiments 2-6, further comprising: obtaining historical query data indicating frequencies of which pairs of search filters are included in a same query; identifying, based on the historical query data, a second search filter of the one or more other search filters included in the second query, wherein the second search filter is searched with the first search filter at a frequency less than each of the one or more other search filters are searched with the first search filter; and generating a third query by removing the second search filter from the second query.
8. The method of any one of embodiments 2-7, further comprising: causing a third search to be performed based on the third query; generating a user interface comprising search results obtained in response to the third search; and providing data for rendering the user interface to a client device.
9. The method of any one of embodiments 2-8, wherein in response to the second search returning a null set: identifying a second search filter of the one or more other search filters included in the second query, wherein the second search filter indicates a location range; and generating a third query by increasing the location range of the second search filter.
10. The method of any one of embodiments 2-9, wherein the hierarchical tree structure of search filters is based on previous user behavior indicating which search filters of the plurality of search filters are searched more frequently than other search filters of the plurality of search filters.
11. The method of any one of embodiments 2-10, further comprising: generating a user interface comprising search results obtained in response to the second search; and providing data for rendering the user interface to a client device.
12. A tangible, non-transitory, machine-readable medium storing instructions that, when executed by one or more processors, effectuate operations comprising any one of embodiments 2-11.
13. A system comprising: memory storing instructions; and one or more processors configured to execute the instructions to effectuate operations comprising those of any of embodiments 2-11.
14. A system comprising means for performing any of one embodiments 2-11.

What is claimed is:

1. A system comprising:
memory storing computer program instructions; and
one or more processors that execute the computer program instructions to effectuate operations comprising:
in response to a first search, performed based on a first query comprising a plurality of search filters, returning a null set:
selecting, from the plurality of search filters, a first search filter based on a hierarchical tree structure of search filters;
generating a second query, comprising the first search filter and one or more other search filters of the plurality of search filters, based on (i) the selection of the first search filter and (ii) frequencies of respective co-filter combinations of the first search filter with each other search filter of the plurality of search filters being included in previous submitted queries; and
causing a second search to be performed based on the second query.

2. The system of claim 1, wherein selecting the first search filter comprises:
determining, based on the hierarchical tree structure, a first rank for the first search filter, wherein the first search filter is selected based on the first rank for the first search filter being greater than a rank of each of the one or more other search filters of the plurality of search filters.

3. The system of claim 1, the operations further comprising:
determining that the second search fails to satisfy a threshold results condition;
identifying, based on the hierarchical tree structure, a second search filter of the one or more other search filters included in the second query having a value that is less than a first value of the first search filter; and
generating a third query by removing the second search filter from the second query.

4. The system of claim 3, wherein the threshold results condition being satisfied comprises a number of search results obtained from the second search being greater than or equal to a threshold number of search results.

5. One or more non-transitory computer readable media comprising computer program instructions that, when executed by one or more processors, effectuate operations comprising:
- in response to a first search, performed based on a first query comprising a plurality of search filters, returning a null set:
  - selecting, from the plurality of search filters, a first search filter;
  - generating a second query, comprising the first search filter and one or more other search filters of the plurality of search filters, based on (i) the selection of the first search filter and (ii) frequencies of respective co-filter combinations of the first search filter with each other search filter of the plurality of search filters being included in previous submitted queries; and
  - causing a second search to be performed based on the second query.

6. The media of claim 5, wherein selecting the first search filter comprises:
- determining, based on a hierarchical tree structure of search filters, a first value for the first search filter, wherein the first search filter is selected based on the first value for the first search filter being greater than a value of each of the one or more other search filters of the plurality of search filters.

7. The media of claim 5, wherein a hierarchical tree structure of search filters is based on previous user behavior indicating which search filters of the plurality of search filters are searched more frequently than other search filters of the plurality of search filters.

8. The media of claim 5, wherein the operations further comprise:
- determining that the second search fails to satisfy a threshold results condition;
- identifying, based on a hierarchical tree structure of search filters, a second search filter of the one or more other search filters included in the second query having a value that is less than a first value of the first search filter; and
- generating a third query by removing the second search filter from the second query.

9. The media of claim 8, wherein the threshold results condition being satisfied comprises a number of search results obtained from the second search being greater than or equal to a threshold number of search results.

10. The media of claim 5, wherein the operations further comprise:
- obtaining historical query data indicating frequencies of which pairs of search filters are included in a same query;
- identifying, based on the historical query data, a second search filter of the one or more other search filters included in the second query, wherein a co-filter combination of the second search filter with the first search filter in the historical query data at a frequency less than other respective co-filter combinations of each of the one or more other search filters with the first search filter; and
- generating a third query by removing the second search filter from the second query.

11. The media of claim 9, wherein the operations further comprise:
- causing a third search to be performed based on the third query;
- generating a user interface comprising search results obtained in response to the third search; and
- providing data for rendering the user interface to a client device.

12. The media of claim 5, wherein in response to the second search returning a null set:
- identifying a second search filter of the one or more other search filters included in the second query, wherein the second search filter indicates a location range; and
- generating a third query by increasing the location range of the second search filter.

13. The media of claim 5, wherein the operations further comprise:
- generating a user interface comprising search results obtained in response to the second search; and
- providing data for rendering the user interface to a client device.

14. A method implemented by one or more processors executing one or more computer program instructions that, when executed, perform the method, the method comprising:
- in response to a first search, performed based on a first query comprising a plurality of search filters, returning a null set:
  - selecting, from the plurality of search filters, a first search filter;
  - generating a second query, comprising the first search filter and one or more other search filters of the plurality of search filters, based on (i) the selection of the first search filter and (ii) frequencies of respective co-filter combinations of the first search filter with each other search filter of the plurality of search filters being included in previous submitted queries; and
  - causing a second search to be performed based on the second query.

15. The method of claim 14, wherein selecting the first search filter comprises:
- determining, based on a hierarchical tree structure of search filters, a first value for the first search filter, wherein the first search filter is selected based on the first value for the first search filter being greater than a value of each of the one or more other search filters of the plurality of search filters.

16. The method of claim 14, further comprising:
- determining that the second search fails to satisfy a threshold results condition;
- identifying, based on a hierarchical tree structure of search filters, a second search filter of the one or more other search filters included in the second query having a value that is less than a first value of the first search filter; and
- generating a third query by removing the second search filter from the second query.

17. The method of claim 16, wherein the threshold results condition being satisfied comprises a number of search results obtained from the second search being greater than or equal to a threshold number of search results.

18. The method of claim 14, further comprising:
- obtaining historical query data indicating frequencies of which pairs of search filters are included in a same query;

identifying, based on the historical query data, a second search filter of the one or more other search filters included in the second query, wherein a co-filter combination of the second search filter with the first search filter in the historical query data at a frequency less than other respective co-filter combinations of each of the one or more other search filters with the first search filter; and generating a third query by removing the second search filter from the second query.

19. The method of claim 14, wherein in response to the second search returning a null set:

identifying a second search filter of the one or more other search filters included in the second query, wherein the second search filter indicates a location range; and generating a third query by increasing the location range of the second search filter.

20. The method of claim 14, further comprising:

generating a user interface comprising search results obtained in response to the second search; and providing data for rendering the user interface to a client device.

\* \* \* \* \*